US006477356B1

(12) United States Patent
Kitamura et al.

(10) Patent No.: US 6,477,356 B1
(45) Date of Patent: Nov. 5, 2002

(54) SOUNDING-BODY HOLDING DEVICE

(75) Inventors: Toshiyasu Kitamura, Kanagawa (JP); Shinichi Terao, Shizuoka (JP); Takashi Osato, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/437,704

(22) Filed: Nov. 10, 1999

(30) Foreign Application Priority Data

Nov. 11, 1998 (JP) ........................................ 10-335014

(51) Int. Cl.$^{7}$ ................................................ H04B 1/38

(52) U.S. Cl. ........................ 455/90; 381/335; 381/336; 381/381

(58) Field of Search ............................ 455/90; 381/87, 381/334, 335, 336, 345, 386, 395

(56) References Cited

U.S. PATENT DOCUMENTS 5,201,069 A * 4/1993 Barabolak .................... 455/90

* cited by examiner

*Primary Examiner*—Lee Nguyen
*Assistant Examiner*—Sharad Rampuria
(74) *Attorney, Agent, or Firm*—Pearne & Gordon LLP

(57) ABSTRACT

A sounding-body holding device comprises: a cover 1 having turn stoppers of a sounding body 3 and a fitting portion for receiving pawls of a holding member in a fitting manner; a cushion 2 having a net attached to the side thereof which is brought into close contact with the cover, the cushion resiliently the sounding body; the sounding body 3 having conductive springs and protrusions used for stopping the turn of the sounding body 3 per se; and a holding member 4 having the pawls for fastening the sounding body 3 onto the cover 1.

8 Claims, 7 Drawing Sheets

SOUNDING-BODY HOLDING DEVICE

BACKGROUND OF THE INVENTION

1. Field of the Invention

The present invention relates to a sounding-body holding device assembled into a portable radio device, for example. More particularly, the invention relates to a structure of the sounding-body holding device in which a cover includes a turn stopper to lock a sounding body in its turn.

2. Description of the Related Art

FIGS. 6 and 7 shows one of the well-known sounding-body holding device, which is assembled into a portable radio device. As shown, a ring-like receptacle stands erect on a cover 11. A doughnut-like cushion 12 is put in the receptacle. To make the sounding-body-holding device proof against dust and water, a net is attached to the side of the cushion 12, which is brought into close contact with the cover. The cushion 12 resiliently holds a sounding body 13. The sounding body 13 with a cable connecting to a connector 14 is put on the cushion 12. In the thus assembled sounding-body holding device, the peripheral surface of the receptacle and that of the sounding body 13 are coupled to each other by an adhesive 15. The connector 14 has connection pins. To set up electrical connection, the connection pins of the connector 14 are inserted into another contact device (not shown).

In the conventional structure of the sounding-body holding device, the sounding body 13 includes cables connecting to the connector 14. Therefore, a space for accommodating the connector 14 and the relatively long cables is indispensably secured in designing the sounding-body holding device. In this respect, the conventional structure has a poor space factor.

The coupling of the peripheral surface of the receptacle with that of the sounding body 13 by an adhesive 15 necessitates the work on the bonding of them.

SUMMARY OF THE INVENTION

Accordingly, an object of the present invention is to provide a sounding-body holding device in which a sounding body, while being locked in turn, is attached to and held by a cover by means of a holding member.

To achieve the above object, there is provided a sounding-body holding device of the present invention comprises: a cover having turn stoppers of a sounding body and a fitting portion for receiving pawls of a holding member in a fitting manner; a cushion 2 having a net attached to the side thereof which is brought into close contact with the cover, the cushion resiliently holding the sounding body; the sounding body having conductive springs and protrusions used for stopping the turn of the sounding body per se; and a holding member having the pawls for fastening the sounding body onto the cover.

More precisely, a first subject matter of the present invention is a sounding-body holding device of the present invention comprises: a cover having turn stoppers of a sounding body and a fitting portion for receiving pawls of a holding member in a fitting manner; a cushion 2 having a net attached to the side thereof which is brought into close contact with the cover, the cushion resiliently holding the sounding body; the sounding body having conductive springs and protrusions used for stopping the turn of the sounding body per se; and a holding member having the pawls for fastening the sounding body onto the cover (claim 1). In this inventive and unique structure of the sounding-body holding device, the sounding body, while being locked in turn, is attached to and held by the cover by means of the holding member.

The first subject matter may have the following limitation: a printed circuit board is mounted such that the printed circuit board is brought into contact with the conductive springs of the sounding body at an appropriate pressure to set up an electrical connection therebetween, and the holding member serves as a spacer located between the printed circuit board and the sounding body (claim 2). With this inventive and unique structure, an operation stroke is secured since it prevents an excessive pressure from being applied to the conductive springs of the sounding body, and further a sound propagation space is secured.

The first subject matter may have the following limitation: The turn stoppers are provided on the cover, so as to be brought into contact with the bifurcated conductive springs of the sounding body (claim 3). This inventive and unique structure reliably locks the sounding body in its turn.

The first subject matter may have the following limitation: The turn stopping protrusion of the sounding body is provided so as to come in contact with the fitting portion of the cover for receiving the pawls of the holding member (claim 4). This inventive and unique structure also locks the sounding body in its turn.

The first subject matter may have the following limitation: The holding member includes removing ribs so as to provide easy removal of the pawls of the holding member per se from the fitting portion (claim 5). With use of the removing ribs enables one to remove the pawls of the holding member from the fitting portion when the former: is fit to the latter.

The first subject matter may have the following limitation: Ribs standing erect on the cover, such as the turn stoppers of the sounding body and the fitting portion for receiving the pawls of the holding member, have guides (slanted parts) (claim 6). Provision of the guides provides an efficient assembling of the sounding body.

The first subject matter may have the following limitation: The fitting portion (rib) for receiving the pawls of the holding member has guides (slanted parts) for easy reception of the pawls (claim 7). Provision of the guides provides an efficient assembling of the holding member.

A second subject matter is a portable radio device including the sounding body set forth in any of the first subject matter and the limitations of the same (claim 8). Therefore, in assembling the portable radio device, the sounding body, while being locked in turn, is attached to and held by the cover by means of the holding member.

DETAILED DESCRIPTION OF THE PRESENT INVENTION

The present invention will be described in detail with reference to the accompanying drawings.

Figure 1:
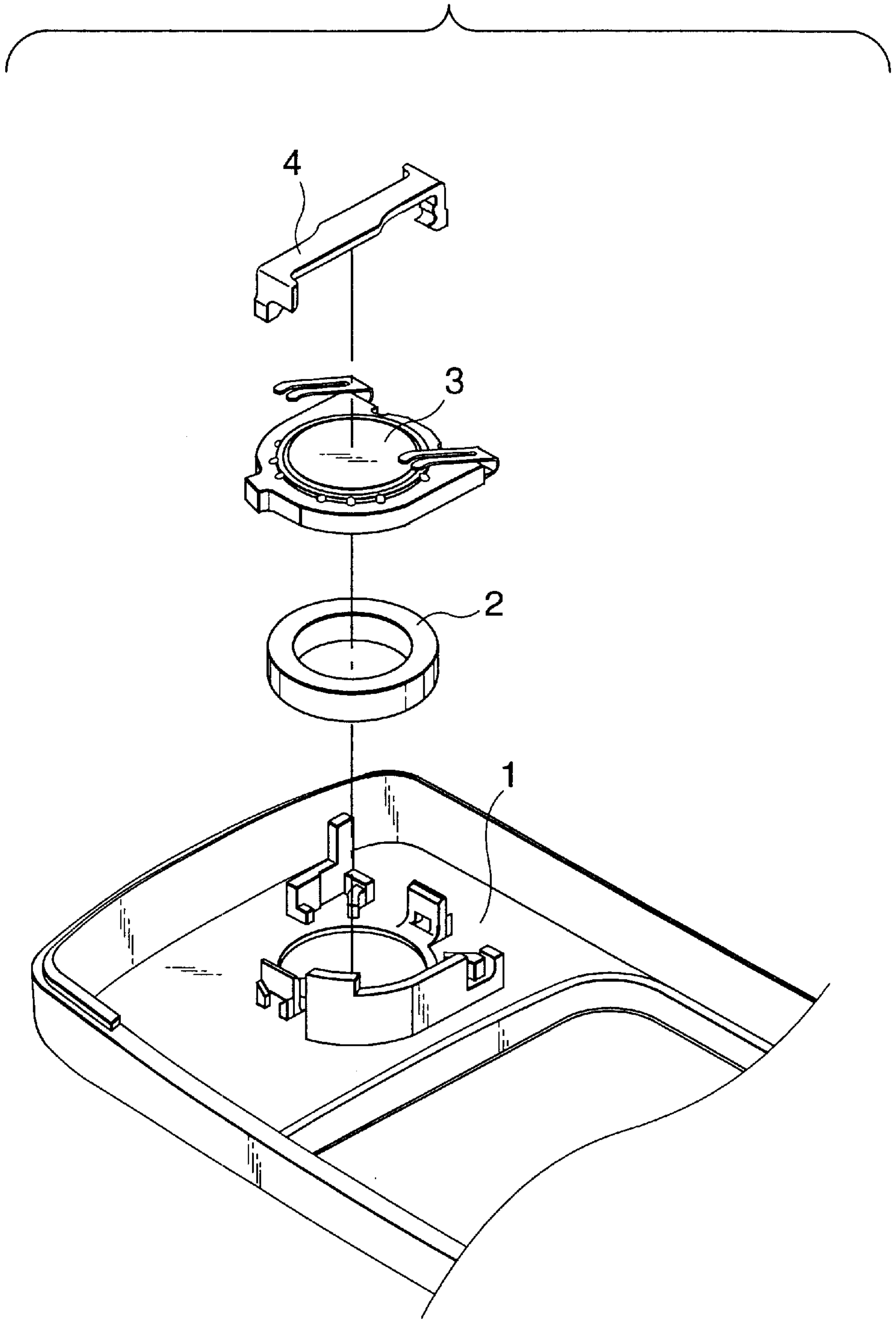
FIG. 1 is an exploded, perspective view showing a structure of a sounding-body holding device which is an embodiment of the present invention.

FIG. 1 is an exploded, perspective view showing a structure of a sounding-body holding device which is an embodiment of the present invention. In the figure, the sounding-body holding device comprises a cover 1, a doughnut-like cushion 2, a sounding body 3 substantially circular when viewed from top or bottom, viz., a disc-like sounding body, and a holding member 4. The cover 1 is provided with turn stoppers of the sounding body 3 and a fitting portion for receiving pawls of the holding member 4 in a fitting manner. To protect the sounding body against dust and water, a net is attached to the side of the cushion 2 to be brought into close contact with the cover. The cushion 2 resiliently holds a sounding body 3. The sounding body 3 includes conductive springs and protrusions used for stopping the turn of the sounding body 3 per se. The holding member 4 includes the pawls for fastening the sounding body 3 onto the cover 1. In FIG. 1, the fitting portion (rib) for receiving the pawls of the holding member 4 has guides (slanted portions) for easy reception of the pawls.

Figure 2:
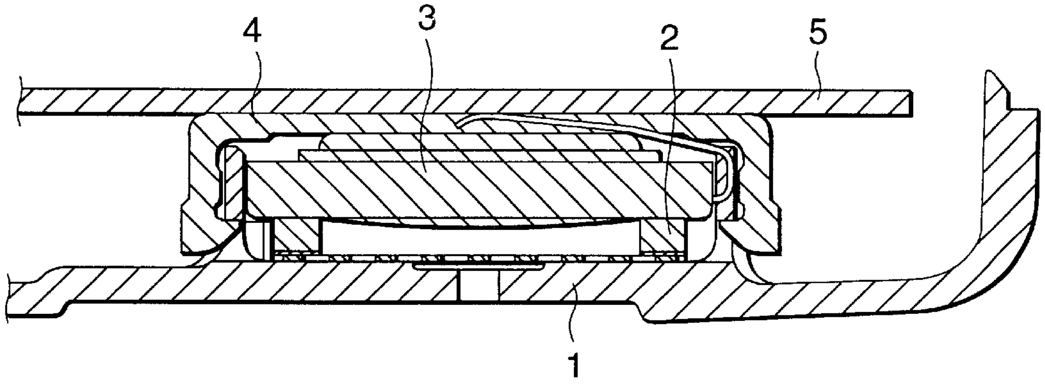
FIG. 2 is a cross sectional view showing the structure of the sounding-body holding device in which conductive springs of a sounding body is coupled with a printed circuit body.

FIG. 2 is a cross sectional view showing the structure of the sounding-body holding device in which the conductive springs of a sounding body is coupled with a printed circuit body. As shown in FIG. 2, in the structure of the sounding-body holding device, a doughnut-like the cushion 2 is put on the cover 1. The cushion 2 is used for resiliently holding the sounding body 3. A dust/water proofing net has been attached to the side of the cushion 2 to be brought into close contact with the cover. The sounding body 3 with the conductive springs is placed on the cushion 2. The holding member 4 is applied onto the sounding body 3 placed on the cushion 2, and the pawls of the holding member 4 are fit into the fitting portion of the cover 1.

After the sounding body 3 is thus fastened, a printed circuit board 5 is mounted on the resultant structure such that it is brought into contact with the conductive springs of the sounding body 3 at an appropriate pressure to set up an electrical connection therebetween. In this case, the holding member 4 serves as a spacer located between the printed circuit board 5 and the sounding body 3. With provision of the holding member, an operation stroke is secured since it prevents an excessive pressure from being applied to the conductive springs of the sounding body 3, and further a sound propagation space is secured.

Figure 3:
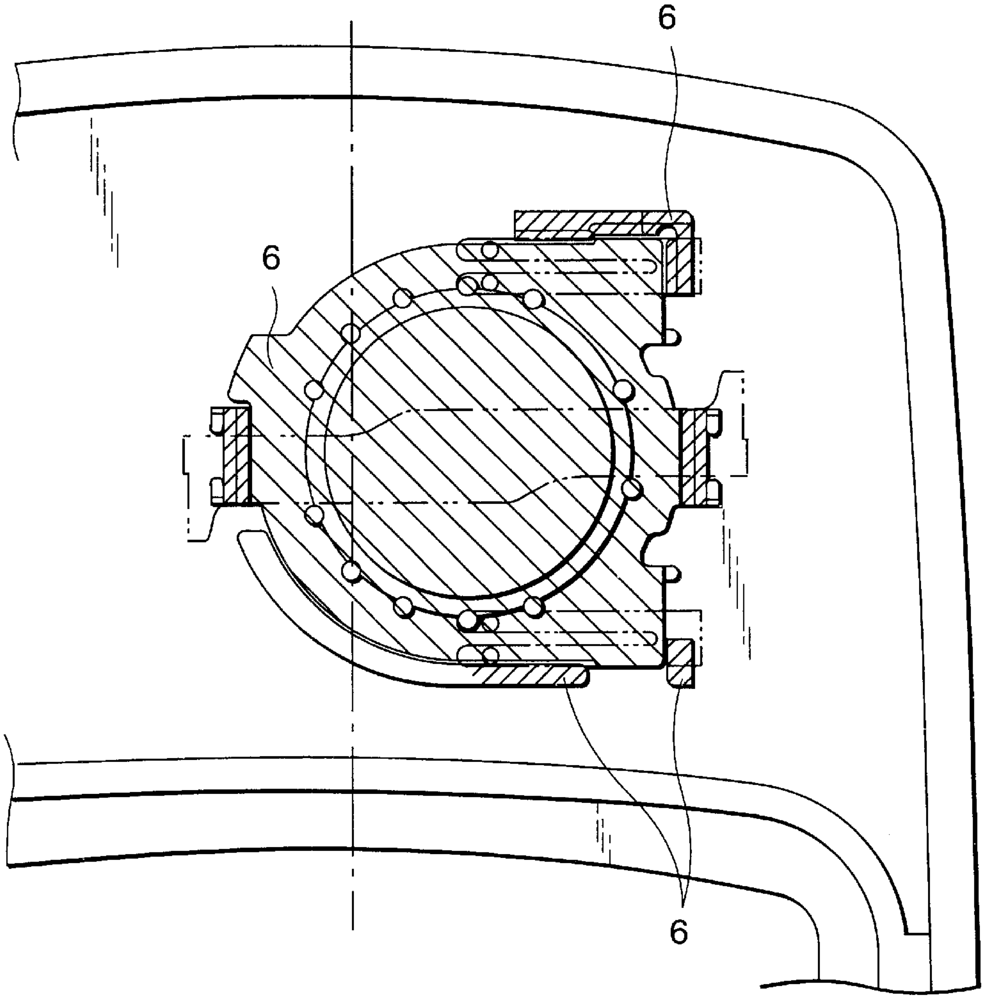
FIG. 3 is a bottom view showing the structure of the sounding-body holding device.

FIG. 3 is a bottom view showing the structure of the sounding-body holding device. As shown, in the structure of the sounding-body holding device, turn stoppers 6 for locking the sounding body 3 in its turn, which is provided on the cover 1, are brought into contact with the bifurcated conductive springs of the sounding body 3. The turn stoppers (protruded portions) 6 of the sounding body 3 are provided so as to be in contact with the fitting portion of the cover 1 which receives the pawls of the holding member 4 in a fitting manner.

Figure 4:
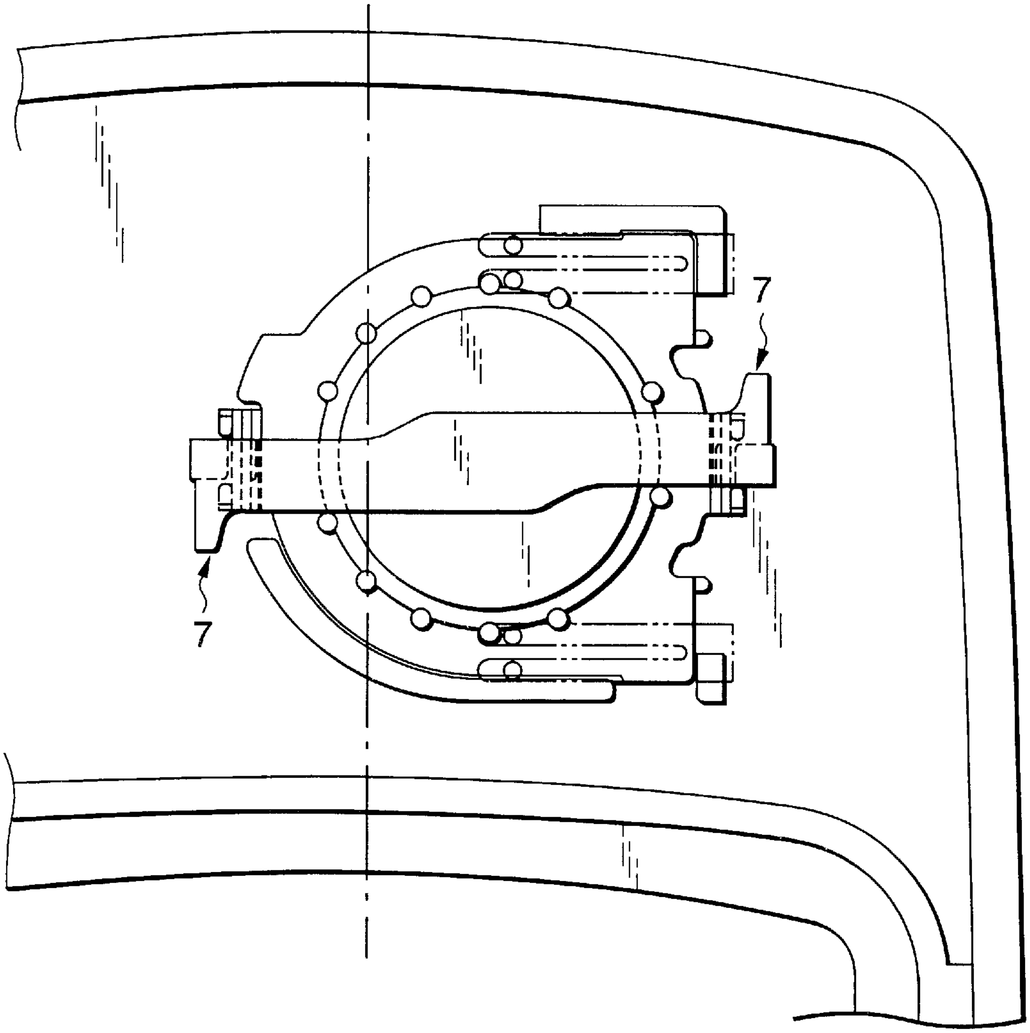
FIG. 4 is a plan view showing the structure of the sounding-body holding device.

FIG. 4 is a plan view showing the structure of the sounding-body holding device, which is viewed from the opposite side to the FIG. 3 structure side. In the figure, small circles that arranged around the sounding body 3 allow the sound to pass therethrough. Removing ribs 7 of the holding member 4 are provided for easy removal of the pawls of the holding member per se from the fitting portion.

Figure 5:
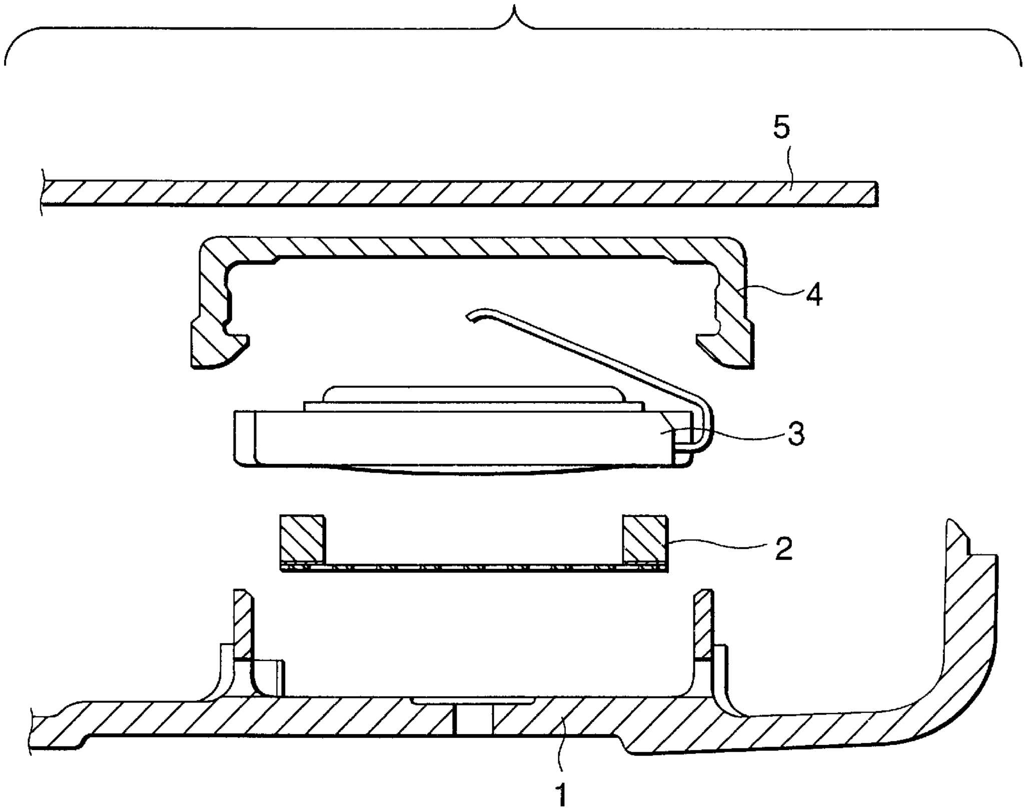
FIG. 5 is an exploded sectional view showing an assembling sequence of the sounding-body holding device and the printed circuit board.
Figure 6:
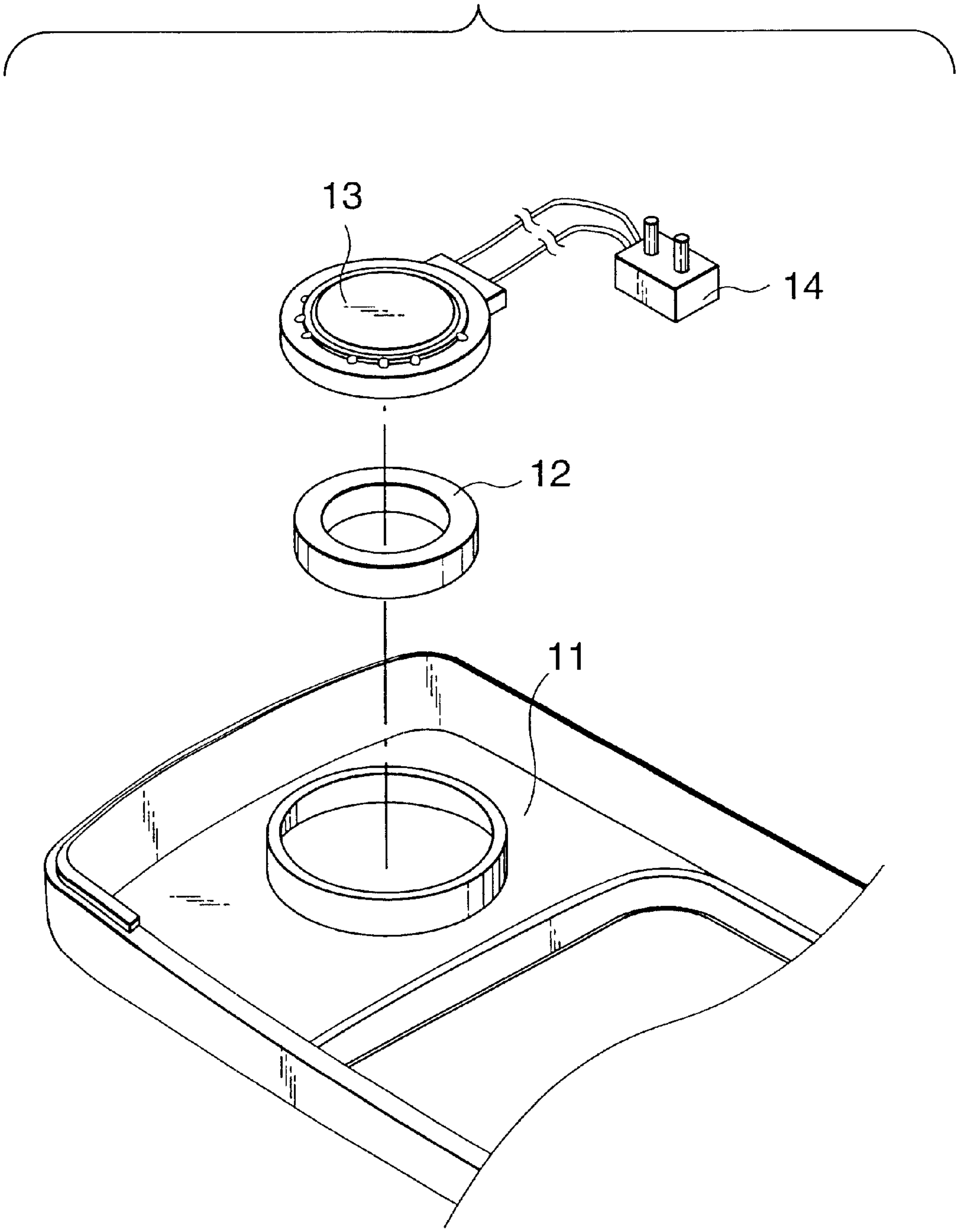
PRIOR ART FIG.6
FIG. 6 is an exploded perspective view showing a conventional sounding-body holding device.
Figure 7:
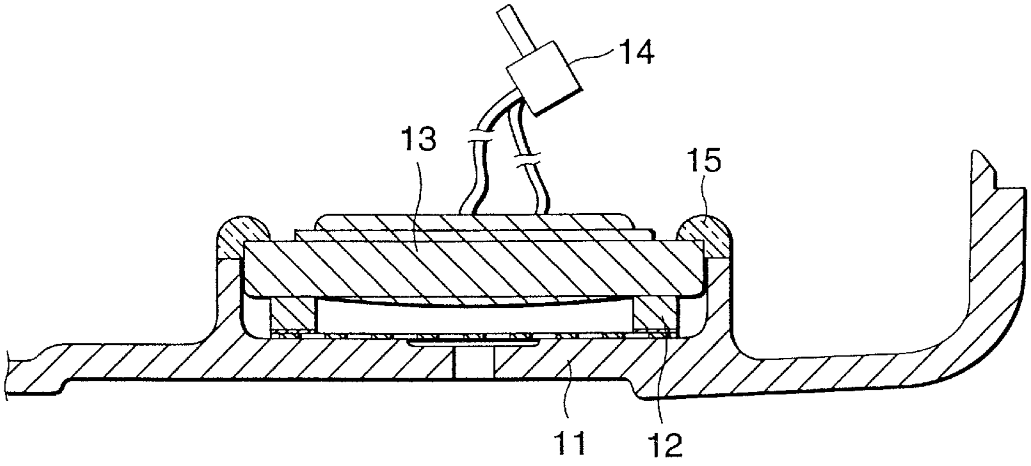
PRIOR ART FIG.7
FIG. 7 is a sectional side elevation showing the conventional sounding-body holding device.

FIG. 5 is an exploded sectional view useful in explaining an assembling sequence of the sounding-body holding device and the printed circuit board. In the sounding-body holding device of FIG. 5, the doughnut-like cushion 2 is put on the cover 1. The cushion 2 is used for resiliently holding the sounding body 3. A dust/water proofing net has been attached to the side of the cushion 2, which is brought into close contact with the cover. The sounding body 3 with the conductive springs is placed on the cushion 2. The holding member 4 is applied onto the sounding body 3, which is placed on the cushion 2, and the pawls of the holding member 4 are fit into the fitting portion of the cover 1. The printed circuit board 5 is mounted on the holding member 4.

As shown in FIG. 5, the members provided on the cover 1, such as the fitting portion for receiving the turn stoppers for locking the turn of the sounding body 3 and the pawls of the holding member 4, viz., members standing erect, have guides (slanted parts) so as to provide an efficient assembling of the sounding body 3.

As seen from the foregoing description, a sounding-body holding device of the present invention comprises: a cover having turn stoppers of a sounding body and a fitting portion for receiving pawls of a holding member in a fitting manner; a cushion having a net attached to the side thereof which is brought into close contact with the cover, the cushion resiliently holding the sounding body; the sounding body having conductive springs and protrusions used for stopping the turn of the sounding body per se; and a holding member having pawls for fastening the sounding body onto the cover. In the sounding-body holding device thus constructed, the sounding body, while being locked in turn, is attached to and held by the cover by means of the holding member.

What is claimed is:

1. A sounding-body holding device comprising:

a cover having a turn stopper and a rib;

a cushion disposed on said cover, said cushion made of an elastic material, said cushion having a net attached to a side on which said cushion is brought into close contact with said cover;

a sounding body disposed on said cushion, said sounding body having a pair of conductive springs and a protrusion; and a holding member having a pawl, wherein said protrusion of sounding body is engaged with said turn stopper of said cover to prevent rotation of said sounding body; and said pawl is engaged with said rib of said cover to fasten said sounding body onto said cove.

2. The sounding body holding device in accordance with claim 1, further comprising:

a printed circuit board brought into contact with said pair of conductive springs of said sounding body at an appropriate pressure to set up an electrical connection therebetween, and wherein said holding member serves as a spacer located between said printed circuit board and said sounding body.

3. The sounding body holding device in accordance with claim 1, wherein said rib is brought into contact with said pair of conductive springs.

4. The sounding body holding device in accordance with claim 1, wherein said protrusion of said sounding body is brought into contact with said rib of said cover.

5. The sounding body holding device in accordance with claim 1, wherein said holding member includes a removing rib to allow easy removal of the pawls of said holding member from said rib.

6. The sounding body holding device in accordance with claim 1, wherein each of said rib and said turn stopper has a slanted portion.

7. The sounding body holding device in accordance with claim 1, wherein said rib has a slanted portion for easy reception of said pawls.

8. A portable radio device comprising a sounding-body holding device including:

a cover having a turn stopper and a rib;

a cushion disposed on said cover, said cushion made of an elastic material, said cushion having a net attached to a side on which said cushion is brought into close contact with said cover;

a sounding body disposed on said cushion, said sounding body having a pair of conductive springs and a protrusion; and a holding member having a pawl, wherein said protrusion of sounding body is engaged with said turn stopper of said cover to prevent rotation of said sounding body; and said pawl is engaged with said rib of said cover to fasten said sounding body onto said cover.

* * * * *

UNITED STATES PATENT AND TRADEMARK OFFICE

CERTIFICATE OF CORRECTION

PATENT NO. : 6,477,356 B1 Page 1 of 1
DATED : November 5, 2002
INVENTOR(S) : Toshiyasu Kitamura et al.

It is certified that error appears in the above-identified patent and that said Letters Patent is hereby corrected as shown below:

Title page,
Item [56], References Cited, U.S. PATENT DOCUMENTS, please insert the following references:

| | | | | | |
|---|---|---|---|---|---|
| -- | 5,819,163 | * | 10/1998 | Tsukamoto et al. | 455/90 |
| | 5,133,018 | * | 07/1992 | Miyazaki | 381/395 |
| | 5,706,358 | * | 01/1998 | Ashworth | 381/152 |
| | 4,404,667 | * | 09/1983 | Koike | 369/65 -- |

Signed and Sealed this

Twenty-second Day of April, 2003

JAMES E. ROGAN
*Director of the United States Patent and Trademark Office*